(12) United States Patent
Yasuda et al.

(10) Patent No.: US 6,853,808 B1
(45) Date of Patent: Feb. 8, 2005

(54) CAMERA AND PORTABLE EQUIPMENT WITH CAMERA

(75) Inventors: Sadayoshi Yasuda, Nagano (JP); Masao Yajima, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 0 days.

(21) Appl. No.: 10/695,417

(22) Filed: Oct. 27, 2003

(30) Foreign Application Priority Data

Aug. 13, 2003 (JP) .................................. 2003-292821

(51) Int. Cl.⁷ ..................... G03B 17/00; H04N 5/262
(52) U.S. Cl. .................. 396/72; 396/374; 348/240.1; 348/333.11
(58) Field of Search ............... 396/72, 374; 348/61, 348/240.1, 333.01, 333.11, 333.12, 552

(56) References Cited

U.S. PATENT DOCUMENTS

| 6,348,948 B1 * | 2/2002 | Kyuma | 348/360 |
| 6,559,888 B1 * | 5/2003 | Doron | 348/240.1 |
| 2004/0012695 A1 * | 1/2004 | Itsukaichi | 348/240.1 |

FOREIGN PATENT DOCUMENTS

| JP | 09-106314 | 4/1997 | ............. G05B/3/00 |
| JP | 10-142472 | 5/1998 | ............. G02B/7/04 |
| JP | 10-150759 | 6/1998 | .......... H02K/33/16 |

* cited by examiner

Primary Examiner—W. B. Perkey
(74) Attorney, Agent, or Firm—Hogan & Hartson, LLP

(57) ABSTRACT

A camera includes a lens driving device and an image obtaining device. The lens driving device is formed from a lens holder that holds a lens and a driving device that moves the lens holder in an optical axis of the lens, wherein the lens holder is intermittently stoppable at least at two positions in the optical axis direction of the lens. The image obtaining device captures optical images of different magnifications at least at the two positions, and obtains zoom images at least between one of the optical images and the other of the optical images based on at least one of the optical images and electronic images generated based on the at least one of the optical images.

23 Claims, 13 Drawing Sheets

Fig. 3
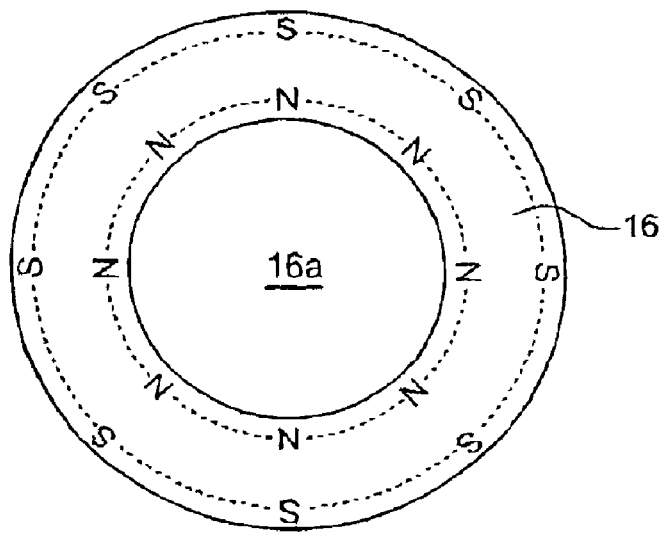
Fig. 4 (a)
Fig. 4 (b)
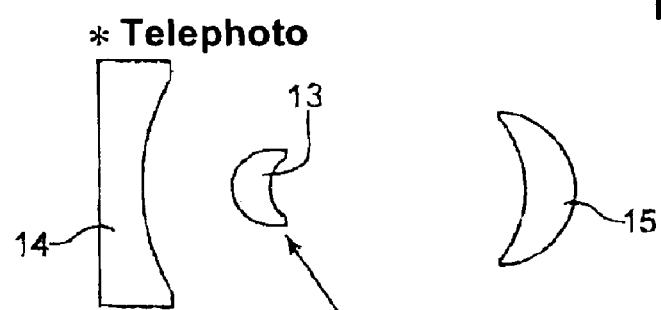
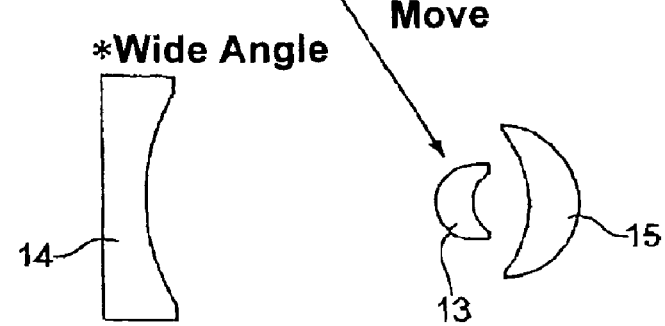
1st Group  2nd Group  3rd Group
Fixed    Moveable   Fixed Composite Electronic Image
(1.8X Image)

Fig. 10 (a)
Optical Image captured at Wide Angle Position

Fig. 10 (b)
Optical Image captured at Telephoto Position

Fig. 10 (c)
Display at Wide Angle Position

Fig. 10 (d)
Display at Telephoto Position

Fig. 10 (e)
Display with 1.8X Magnification

In the case of
2-stage Zooming

In the case of
3-stage Zooming

CAMERA AND PORTABLE EQUIPMENT WITH CAMERA

BACKGROUND OF THE INVENTION

1. Field of the Invention

The present invention relates to cameras and portable equipment with camera.

2. Related Background Art

Thin cameras that may be mounted on portable telephones with camera have shorter lens moving distance for focus and zoom adjustments in photographing compared to other ordinary cameras. For this reason, lens driving devices that magnetically drive the lens directly are suitable for use as lens driving devices applied to such cameras.

Among such lens driving devices of the magnetic drive type, the following, for example, are known. A lens driving device that has been suggested includes a cylindrical lens holder for holding a lens, a ring-shaped rotor magnet mounted on the outer circumference of the lens holder, and a drive coil that opposes the rotor magnet. By controlling the energization of the drive coil, the lens holder holding the lens is directly moved linearly in the optical axis direction to a predetermined position without the intervention of any conversion mechanism and magnetically held in the position.

Another type of lens driving device that uses a guide shaft that guides a lens holder holding a lens along the optical axis is known as an example of utilizing a conversion mechanism that converts a motor's rotational force into linear motion.

When taking a picture by a portable phone with camera, the portable phone is often held with one hand to take a picture of the holder's face or other subjects in close proximity. For this reason, photographic lenses used in this type of camera often have a close-up photographing function. In photographic lenses having such a close-up photographing function, the lens position for ordinary photographing and the lens position for close-up photographing, or macro photographing, are different. In other words, the lens position for close-up photographing is slightly closer to subject by a predetermined distance compared to the lens position for ordinary photographing.

As a result, this type of photographing lenses is provided with a driving source for moving the lens position between the ordinary photographing position and the macro photographing position, and the driving source is driven with a switch to move the lens between the two points of photographing positions. However, it is difficult to utilize a motor as a driving source on portable equipment such as portable telephones, due to the need to miniaturize the equipment and achieve lighter weight. Furthermore, since photographing takes place only in two positions, a lens driving device in which electromagnetic force is directly applied to the lens drive to move the lens is desirable.

However, in the conventional lens driving devices in which a lens holder is magnetically moved without a force conversion system, subtle positional controls that are required when executing zoom operations to enlarge or reduce an image are extremely difficult. Furthermore, since the drive coil is energized and excited to hold the lens holder in position, when the energization ceases, the lens holder is released from its position. Consequently, there is an additional problem of the lens position shifting as a result of external force and vibration when the energization ceases. On the other hand, always supplying power would result in large power consumption, which would make it impossible to mount the lens driving device on portable equipment such as portable telephones.

Moreover, in a lens drive mechanism in which rotational motion is converted into linear motion, although positional control during zoom operations is easy, the force transmission mechanism and conversion mechanism from the motor mechanism to the lens holder become complicated, which can result in poor assembly efficiency and a large device with a built-in lens drive mechanism.

SUMMARY OF THE INVENTION

The present invention has been conceived to solve the problems described above, and relates to cameras and portable equipment with camera, with which superior zoom display can be performed using a relatively simple mechanism.

In accordance with an embodiment of the present invention, a camera includes a lens driving device including a lens holder that holds a lens and a driving device that moves the lens holder in an optical axis of the lens, wherein the lens holder is intermittently stopped at least at two positions in an optical axis direction of the lens, and an image obtaining device that captures optical images of different magnifications at the at least two positions, and obtains zoom images between one of the optical images and the other of the optical images based on at least one of the optical images and electronic images generated based on the at least one of the optical images.

According to the present embodiment, the lens holder is not continuously stoppable but rather intermittently stoppable. As a result, the structure for stopping the lens holder is not complicated. Furthermore, due to the fact that optical images taken at the stop positions of the lens holder can be used to obtain images with different optical magnifications between the stop positions, enlarged and reduced zoom images between the stop positions can be easily obtained. In addition, since an optical image is captured at each of the stop positions, displays based on superior images can be made at both the beginning and end of zooming. As a result, zoom displays can be made in excellent quality with a relatively simple mechanism.

In accordance with another embodiment of the present invention, a camera includes a lens driving device including a lens holder that holds a lens and a driving device that moves the lens holder in an optical axis of the lens, and an image obtaining device that obtains zoom images at least through continuous image processing between a wide angle position and a telephoto position of different magnifications. In one aspect, the lens holder is intermittently stopped at at least two positions, for example, at the wide angle position and an intermediate position between the wide angle position and the telephoto position, to capture an optical image at the wide angle position and an optical image at the intermediate position; and the image obtaining device obtains enlarged zoom images past the wide angle position and up to immediately before the intermediate position through electronically processing the optical image taken at the wide angle position and obtains enlarged zoom images past the intermediate position and up to the telephoto position through electronically processing the optical image taken at the intermediate position.

According to this embodiment, the lens holder is not continuously stoppable but rather intermittently stoppable. As a result, the structure for stopping the lens holder is not complicated. In addition, enlarged zoom images from the wide angle position to the intermediate position can be obtained based on the optical images taken at the wide angle position and the intermediate position and electronic images obtained through electronic processing of these optical images, and further enlarged images can be obtained based on the optical image taken at the intermediate position and electronic images obtained through electronically processing the optical image taken at the intermediate position. Consequently, enlarged zoom images with superior display quality can be obtained over a wide range.

In accordance with another embodiment of the present invention, a camera includes a lens driving device including a lens holder that holds a lens and a driving device that moves the lens holder in an optical axis of the lens wherein the lens holder is configured to be intermittently stoppable in at least two positions in the optical axis direction, e.g., a first position on a wide angle side and a second position on a telephoto side whose magnification is greater than the magnification on the wide angle side, and an image obtaining device that captures optical images with different magnifications and obtains zoom images between one of the optical images and another of the optical images based on the optical images with different magnifications and electronic images obtained by electronically processing the optical images. In one aspect, the image obtaining device captures an optical image at the first position and utilizes the optical image to form enlarged zoom images when an image enlargement zooming between the two positions is instructed, and also captures an optical image at the first position and utilizes the optical image to form reduced zoom images when an image reduction zooming between the two positions is instructed.

According to this embodiment, the lens holder is not continuously stoppable but rather intermittently stoppable. As a result, the structure for stopping the lens holder is not complicated. In addition, since zoom images between the wide angle side and the telephoto side are obtained based on the optical images taken at the wide angle and telephoto positions and the electronic images between the wide angle position and the telephoto position, a superior zoom image display can be performed with a simple mechanism.

Since the optical image in the first position on the wide angle side is used in both enlargement zooming and reduction zooming, an image with a wide angle of view, or an image with a large amount of information, can be used. This allows images both in enlargement and reduction to be displayed smoothly.

In accordance with another embodiment of the present invention, in addition to the camera described above, the image obtaining device may preferably include a zoom instruction read device for reading zoom instructions and an operational position confirmation device for confirming the current lens operation position, such that when a zoom instruction is read by the zoom instruction read device, the lens is driven by the lens driving device to the position read by the operational position confirmation device.

According to this embodiment, the operation of driving the lens is performed efficiently, since the lens is driven only when necessary based on reading the zoom instruction and confirming the current position of the lens. Furthermore, since zooming takes place after the lens is returned to its correct position, a proper image is captured.

In accordance with another embodiment of the present invention, in addition to the camera described above, the image obtaining device may preferably include a current position detection device for detecting the current position of the lens, such that if the operational position is on the wide angle side, the current position detection device detects whether the current position of the lens is the first position, and if the current position is not the first position, the lens is moved to the first position by the lens driving device, and if the current position is the first position, the lens remains in place and an optical image is captured in the first position in both cases; on the other hand, if the operational position is on the telephoto side, the current position detection device detects whether the current position of the lens is the second position, and if the current position is not the second position, the lens is moved to the second position by the lens driving device, and if the current position is the second position, the lens remains in place and an optical image is captured in the second position in both cases.

According to this embodiment, due to the current position detection device for detecting the current position of the lens, the lens can be driven or not driven depending on the detection result, which translates into an efficient lens driving.

If an image enlargement zooming is instructed, the image obtaining device may preferably move the lens to the second position before the enlargement magnification reaches the optical magnification in the second position, capture an optical image in the second position in advance, and form an image for displaying a second enlargement zoom image formed by utilizing the optical image captured in the second position after displaying a first enlargement zoom image utilizing an optical image captured in the first position, such that enlarged zoom images from the first position to the second position are obtained based on the first zoom image and the second zoom image.

According to this embodiment, deterioration of the quality of enlarged images obtained through electronic processing can be prevented to a large extent. In other words, since the second zoom image following the first zoom image is formed by utilizing an optical image that is captured at the second position which is equivalent to an enlargement image to be attained from the optical image captured in the first position, there is a large amount of information that can be used to create a superior image.

The second zoom image may preferably be obtained by placing an enlarged image obtained by electronically processing the optical image captured in the first position on a peripheral area of the optical image captured in the second position.

As a result, the image quality in the center part of the second zoom image, which requires high image quality since it is the part where users' eyes tend to look at, improves and therefore eliminates an impression that something is out of place when a viewer who is looking at the electronic zoom image sees the optical image that follows. This makes it possible to achieve a more natural zoom display.

A portable equipment with camera in accordance with another embodiment of the present invention includes one of the cameras described above and a display device for displaying images captured or obtained by the camera.

According to the present embodiment, since a superior zoom display is possible in spite of a simple mechanism, miniaturization and operational stabilization of portable equipment can be readily achieved. Furthermore, due to the fact that the quality of the zoom display is superior and that the zooming range can be widened, the added value can be boosted for the portable equipment with camera.

A camera according to the present invention can achieve a superior zoom display with a relatively simple mechanism.

Furthermore, portable equipment with camera according to the present invention can perform a superior zoom display with a relatively simple mechanism and achieve miniaturization and operational stabilization.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 3 is a plan view of a drive magnet used in the lens driving device in FIG. 1.

FIGS. 4(a) and 4(b) are diagrams illustrating the movement of a second lens group in the lens driving device in FIG. 1.

FIGS. 10(a)–10(e) are diagrams illustrating another example of electronic images formed by the operational flow in FIG. 8.

FIGS. 12(a) and 12(b) are diagrams illustrating the prevention of image quality deterioration in each of the lens driving devices used in cameras according to the present invention, wherein FIG. 12(a) is a diagram for the lens driving device according to the first embodiment of the present invention, and FIG. 12(b) is a diagram for the lens driving device according to the second embodiment of the present invention.

DESCRIPTION OF PREFERRED EMBODIMENTS

Cameras and portable equipment with camera in accordance with preferred embodiments of the present invention will be described below with reference to the accompanying drawings. In the following, the description is primarily focused on lens driving devices of cameras. The cameras (and lens driving devices) according to various embodiments are structured to be suitable for mounting as camera sections of portable equipment such as portable telephones (i.e., cellular phones), but they may also be mounted on other portable equipment such as PDAs (personal digital assistants).

Figure 1:
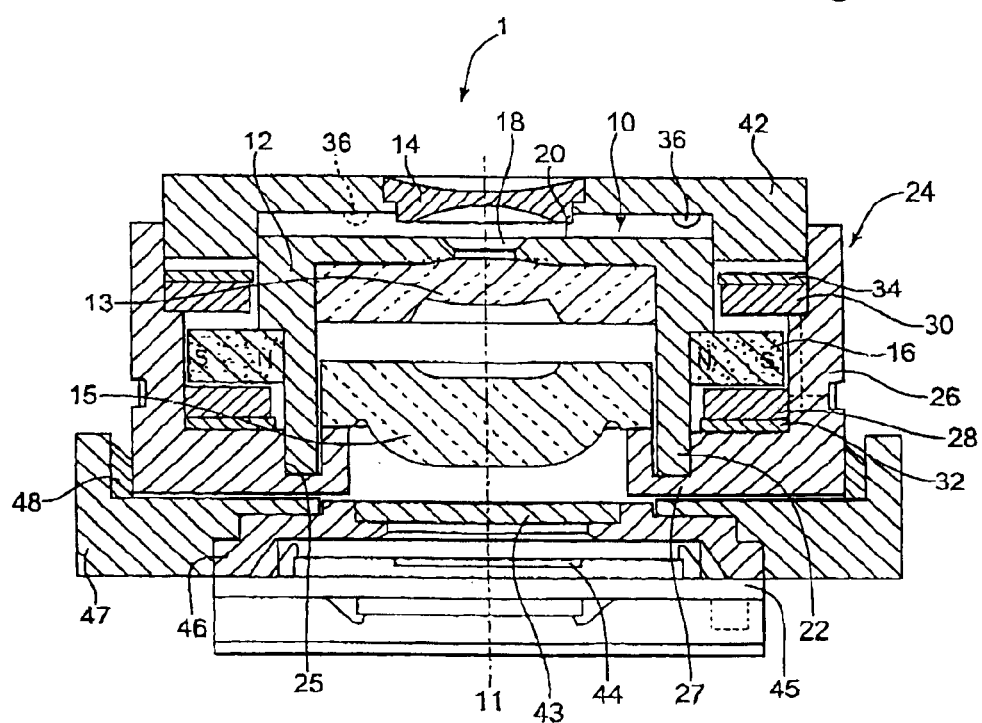
FIG. 1 is a cross-sectional view of a lens driving device in accordance with a first embodiment of the present invention which is to be assembled into a camera.

A lens driving device 1 according to the first embodiment shown in FIGS. 1 through 10 primarily includes a moving body 10 and a fixed body 24. The fixed body 10 has a lens-barrel 12, which is a generally cylindrical lens holder in the center of which an optical axis 11 is positioned, and inside the lens-barrel 12 is a lens 13, which is a second lens group. The lens 13 may be composed of a combination of a plurality of lenses or a single lens. On the top side (i.e., the subject side) of FIG. 1 is positioned a lens 14, which is a first lens group, while on the bottom side (i.e., the camera body side) is positioned a lens 15, which is a third lens group.

The lens 14, which is the first lens group, is affixed to a cover 42, and the lens 15, which is the third lens group, is affixed to the fixed body 24. Only the lens 13, which is the second lens group, is movable forward and backward in the optical axis direction to define a telephoto position (FIG. 4(a)) and a wide angle position (FIG. 4(b)). In front of the lens 14, which is the first lens group, a freely opening/closing barrier for lens protection may be provided, although its illustration is omitted.

The outer circumference of the lens-barrel 12 is formed such that it has a large diameter on the front side and a small diameter on the rear side, with a step section formed at the boundary between the two. On the small diameter section on the rear side is mounted a drive magnet 16. The drive magnet 16 abuts the step section and affixed in a unitary fashion to the lens-barrel 12. The drive magnet 16 protrudes outward from the outer circumference surface of the lens-barrel 12 as if it were a flange section of the lens-barrel 12.

On a front end section of the lens-barrel 12, i.e. an end section on the subject side, is provided with a circular light incident window 18, which introduces reflected light from the subject into the lens 13, in the center of a front end surface 20. The light incident window 18 may be larger than as shown in FIG. 1 or positioned forward of the lens 14, which is the first lens group.

The lens-barrel 12 is inserted into the fixed body 24. The fixed body 24 is also formed in a generally cylindrical shape, and the outer circumference of a rear end section 22 of the lens-barrel 12 is mounted in a rear end section inner circumference 25 of the fixed body 24 in a manner movable in the direction of the optical axis 11 of the lens 13, with the rear end section inner circumference 25 of the fixed body 24 as its guide. An inner end side, or the limit of movement for the lens-barrel 12 towards the camera body side, is determined by a rear end surface of the lens-barrel 12 abutting a concave-shaped bottom surface 27, which is formed facing inward on the rear end of a cylindrical section 26 that forms the fixed body 24. FIG. 1 shows a state in which the lens-barrel 12 has moved to the inner most end side.

Figure 2:
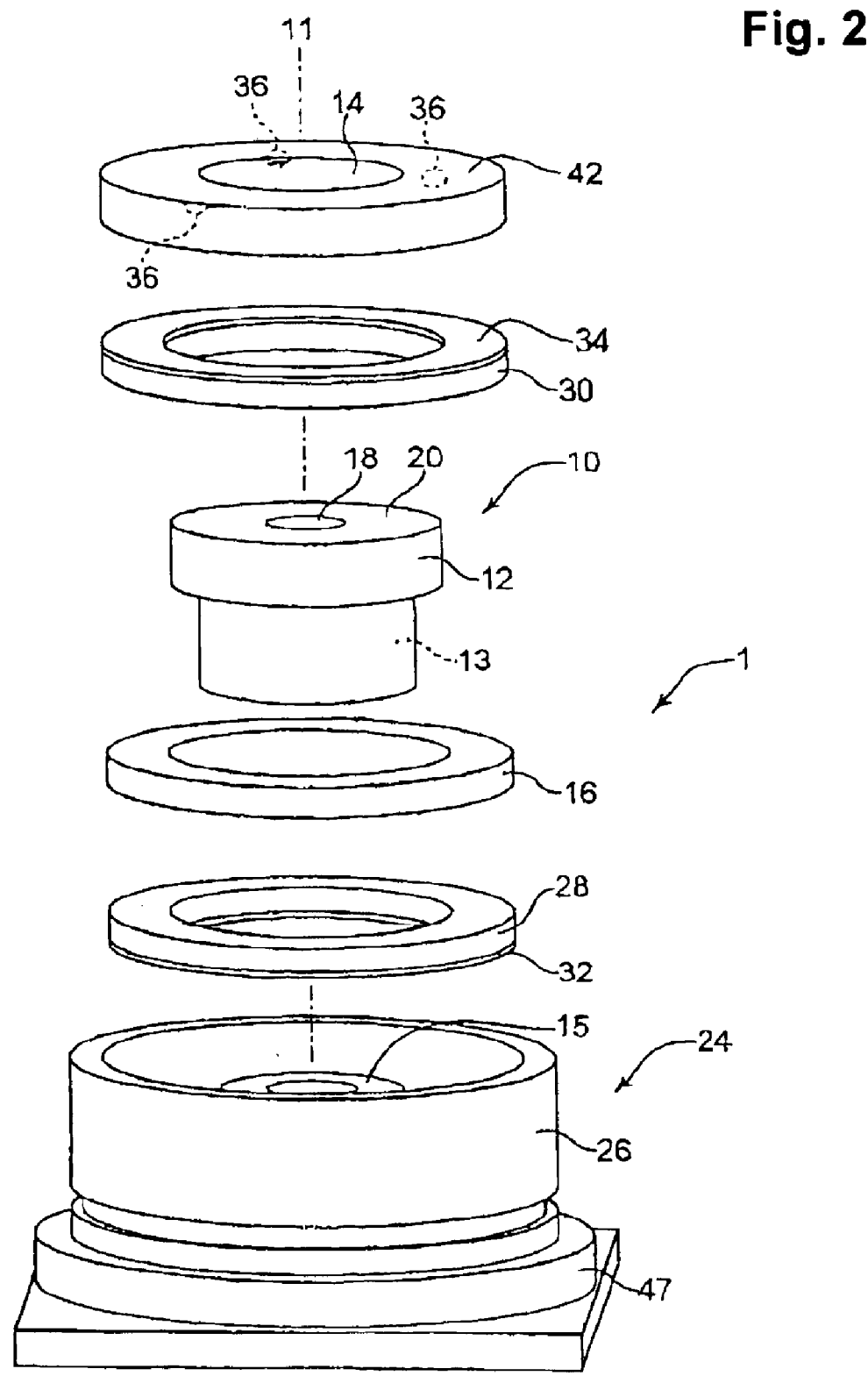
FIG. 2 is an exploded perspective view of the lens driving device in FIG. 1.

The drive magnet 16 that moves in a unitary fashion with the lens-barrel 12 is ring-shaped as shown in FIGS. 2 and 3. A part of the drive magnet 16 surrounding a center hole 16a is magnetized with a single pole of N pole, while the entire outer circumference part is magnetized with a single pole of S pole. The N and S poles may have a reverse magnetization relationship. The drive magnet 16 is placed forward of the rear end section inner circumference 25 of the cylindrical section 26 and opposite the inner circumference of the cylinder 26, whose inner diameter is larger than the diameter of the rear end section inner circumference 25, across a small gap. Furthermore, the drive magnet 16 is housed in a manner movable with respect to the cylindrical section 26 in the direction of the optical axis 11.

At the inner end side of the fixed body 24 and at the center of the concave section that surrounds the bottom surface 27 is fixed the lens 15, which is the third lens group, by adhesive. On the inner circumference of the fixed body 24 and on the inner end side than the drive magnet 16 is placed a first drive coil 28, which is wound in a ring shape to oppose the drive magnet 16; and a second drive coil 30 is placed to interpose the drive magnet 16 with the first drive coil 28.

A ring-shaped first magnetic member 32 is mounted on the inner end side of the first drive coil 28, and the first magnetic member 32 and the first drive coil 28 are both affixed to the cylindrical section 26 of the fixed body 24 by adhesive. As described above, the front end surface of the first drive coil 28 and the rear end surface of the drive magnet 16 oppose each other.

As described above, the second drive coil 30, which is wound around in a circular ring shape, is mounted in a position forward of the drive magnet 16 on the inner circumference of the front end section of the fixed body 24, and a ring-shaped second magnetic member 34 is mounted together with the drive coil 30 and affixed to the cylindrical section 26 of the fixed body 24 by adhesive. The front end surface of the drive magnet 16 and the rear end surface of the second drive coil 30 oppose each other. Accordingly, the first magnetic member 32 and the second magnetic member 34 are placed on the outer end surfaces in the optical axis direction of the first drive coil 28 and the second drive coil 30, respectively, that are aligned in the direction of the optical axis 11 with the drive magnet 16 being interposed between them. Furthermore, the drive magnet 16 is interposed by the first and second drive coils 28 and 30 in the direction of the optical axis 11.

The first and second magnetic members 32 and 34 are each made of a ferromagnetic member in a washer shape, such as a steel plate, for example. The magnetic flux generated by the drive magnet 16 passes through the first drive coil 28 and the first magnetic member 32 from their center towards the outer circumference side and returns to the drive magnet 16. The magnetic flux generated by the drive magnet 16 also passes through the second magnetic member 34 and the second drive coil 30 from their center towards the outer circumference side and returns to the drive magnet 16, and these members described above constitute a magnetic circuit. Consequently, the first and second drive coils 28 and 30 are positioned within a magnetic field formed by the drive magnet 16.

The distance between opposing surfaces of the first and second drive coils 28 and 30 is larger than the thickness of the drive magnet 16 in the direction of the optical axis 11, and a gap is formed between the drive magnet 16 and the first drive coil 28 or between the drive magnet 16 and the second drive coil 30 in the direction of the optical axis 11, and the drive magnet 16, and therefore the lens-barrel 12 that moves in a unitary fashion with the drive magnet 16, can move in the direction of the optical axis 11 within the range of this gap.

According to the first embodiment, the drive magnet 16 along with the lens-barrel 12 shifts to the inner end side and is retained at the shifted position by the magnetic attractive force between the drive magnet 16 and the first magnetic member 32, as shown in FIG. 1, even without any energization of the drive coils 28 and 30. The position of the lens 13 is in a photographing position in wide angle (hereinafter called a "wide angle position"). In this position, as shown in FIG. 1, there is a small gap between the first drive coil 28 and the drive magnet 16. If the first drive coil 28 and the drive magnet 16 collide with each other, one or both would be damaged, and the small gap between them prevents such collision.

In the state shown in FIG. 1, when a predetermined zoom switch (not shown) is operated to switch to an enlargement, at least one of the first and second drive coils 28 and 30 is energized in the predetermined direction, and the direction of the current and the direction of the magnetic field generated by the drive magnet 16 cause the activation of an electromagnetic force in a direction to push the drive magnet 16 forward based on Fleming's left-hand rule, so that the drive magnet 16 along with the lens-barrel 12 moves forward. The amount of forward movement is defined by a range of the gap between the drive magnet 16 and one of the first and second drive coils 28 and 30. When the lens-barrel 12 along with the lens 13 advances forward, the new position is a photographing position in telephoto (hereinafter called a "telephoto position").

It is noted that Fleming's left-hand rule represents the relationship between a magnetic field, a line current circulating in the magnetic field and a force that works on an object that circulates the line current. According to the present embodiment, since the drive coils 28 and 30 are both fixed, a force is applied to the drive magnet 16 as a counter action. Between the wide angle position and the telephoto position, enlarged zoom images are formed through an electronic processing described later.

When the lens-barrel 12 advances forward, the forward advancement is stopped by the front end surface 20's colliding into a positioning protrusion 36, described later. The position of the lens 13 when it has advanced forward is maintained by the magnetic attractive force between the drive magnet 16 and the second magnetic member 34, even without any energization of the drive coils 28 and 30. In this state as well, a small gap is formed between the second drive coil 30 and the drive magnet 16. This gap also serves to prevent the second drive coil 30 and the drive magnet 16 from colliding into each other and damaging one or both.

The electromagnetic force generated when the lens-barrel 12 moves forward is generated in the direction to move the drive magnet 16 forward when the first drive coil 28 is energized, and in the direction to move the drive magnet 16 forward also when the second drive coil 30 is energized. The first and second drive coils 28 and 30 may both be energized simultaneously, or one or the other may be energized.

The positioning protrusion 36 is formed on the surface of the fixed body 24 to oppose the front end surface 20 of the lens-barrel 12 and to ensure positioning precision of the lens-barrel 12 when the electromagnetic force causes the lens-barrel 12 to advance forward. The positioning protrusion 36 may be formed as a plurality of protrusions on a surface of the circular, pan-shaped cover 42 that makes up the fixed body 24 to oppose the moving body 10. The cover 42 serves to receive the light from the subject with the lens 14, which is the first lens group fixed to the cover 42, and to pass the light towards the lens 13. In addition, the cover 42 serves a function of preventing external dust and dirt from entering the lens 13 side; the cover 42 is mounted on the cylindrical section 26 of the fixed body 24 and is fixed to the cylinder 26 by adhesive.

On the inner end side along the optical axis 11 of the lens driving device 1, a filter 43 is positioned on a rear end member 46, which is fixed to a base section 47, described later; and further to the inner end is fixed and placed an image capturing element 44. The filter 43 serves to block lights of predetermined wavelengths in accordance with the detection wavelength of the image capturing element 44. The image capturing element 44 may be composed of CMOSs (Complimentary Metal Oxide Semiconductors) and sends its detected signal to a circuit substrate 45. Image signal, which is the detection signals, are sent to a control section (which may be composed of a microcomputer) placed on the circuit substrate 45.

The circuit substrate 45 may be smaller in size or outer diameter than the outer diameter of the cylindrical section 26 that makes up the fixed body 24, so that the circuit substrate 45 would not project outside the cylindrical section 26. It is noted that, aside from CMOS, CCD or VMIS may be used for the image capturing element 44.

To switch from the telephoto position to the wide angle position, the zoom switch is switched to the reduction side. By switching in this way, at least one of the first and second drive coils 28 and 30 is energized in the reverse direction, and the direction of the current and the direction of the magnetic field generated by the drive magnet 16 activate an electromagnetic force in the direction to pull the drive magnet 16 backward based on Fleming's left-hand rule, so that the drive magnet 16 along with the lens-barrel 12 moves rearward and the lens position goes into the wide angle position shown in FIG. 1. Between the wide angle position and the telephoto position, reduced zoom images are formed through an electronic processing to be described later.

An example of dimension data of the first embodiment in FIG. 1 is as follows: the outer diameter of the cylindrical section 26 of the fixed body 24 is 10.5 mm, the height of the cylindrical section 26 is 5.5 mm, and the moving stroke of the lens-barrel 12 is approximately 0.2–1.5 mm. It is desirable for the three lenses 13, 14 and 15 to be aspherical lenses that are also resin lenses. The minimum drive time to apply current to the first drive coil 28 and/or the second drive coil 30 to switch between the wide angle position and the telephoto position is 5 msec.

As described above, the cylindrical section 26 and the cover 42 serve as constituent members of a frame for the fixed body 24 in the lens driving device 1 according to the first embodiment; the cylindrical section 26 is affixed by an adhesive to the base section 47, on which is mounted and held the rear end member 46, which in turn holds the filter 43 and the image capturing element 44. Consequently, according to the present embodiment, the rear end member 46 and the base section 47 also form a part of the fixed body 24.

The first embodiment shown in FIG. 1 is a moving magnet type configuration, in which the drive magnet 16 is placed on the moveable side and the drive coils 28 and 30 are placed on the fixed side. However, the lens driving device may be a moving coil type, in which a drive coil is placed on the movable side and drive magnets are placed on the fixed side.

For example, a moving body 10 may comprise a drive coil and a magnetic member that are movable along with a lens 13 in the direction of an optical axis 11, while a fixed body 24 comprises a first drive magnet and a second drive magnet placed in the direction of the optical axis 11 of the lens 13 to interpose the drive coil in between and further forms a magnetic circuit with the drive magnet. When energization of the drive coil ceases, the magnetic attraction between either the first drive magnet or the second drive magnet and the magnetic member causes the moving body to be held in a predetermined position, and the energization of the drive coil causes the moving body 10 to move between the first drive magnet and the second drive magnet. A flexible lead wire may have to be used in order to energize the movable drive coil, but no special lead wires are required since, as described earlier, a moving stroke of approximately 0.2–1.5 mm is sufficient for lens driving devices applied to cameras mounted on portable equipment.

In the first embodiment shown in FIG. 1, the flow of the magnetic flux from the drive magnet 16 to the first drive coil 28 and/or the second drive coil 30 is required only to be a directional component in the first drive coil 28 and/or the second drive coil 30 that is required to drive the drive magnet 16. Consequently, the drive magnet 16 can generate the flow of the magnetic flux either more inward than the inner diameter of the drive coils or more outward than the outer diameter of the drive coils.

Figure 5:
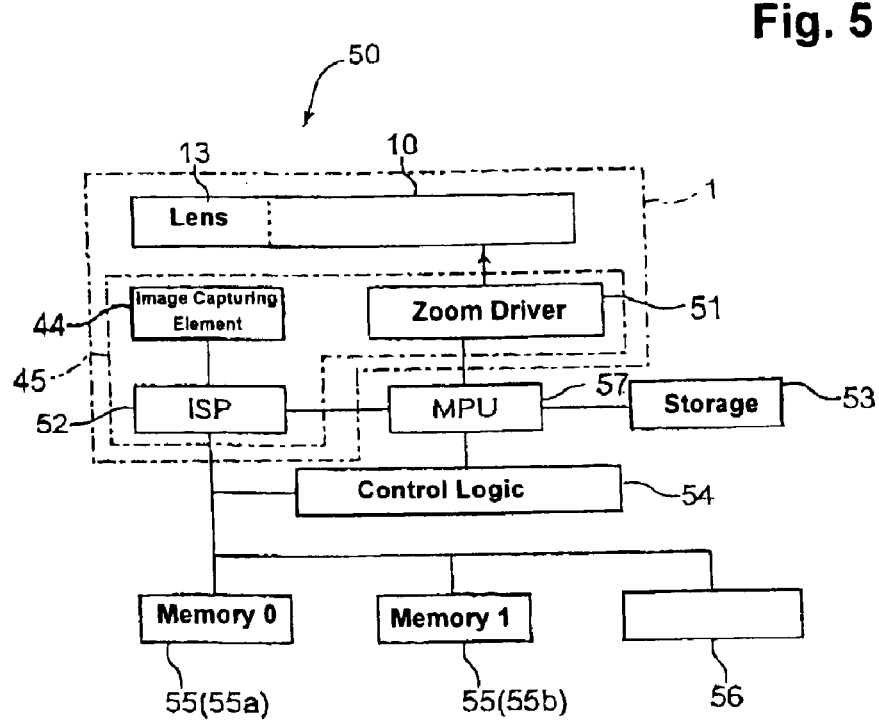
FIG. 5 is a block diagram of the system configuration of a camera including the lens driving device in FIG. 1.

Next, referring to FIG. 5, a system configuration of a camera 50 that includes the lens driving device 1 according to the first embodiment will be described.

The camera 50 comprises a zoom driver 51 that drives the moving body 10 with the lens 13, which is the first lens group, and realizes zoom operation; an ISP (image signal processor) 52 that processes image signals obtained from the image capturing element 44; a storage device 53 that stores image data; a control logic section 54; one or more memories 55 that temporarily store images; a display unit 56 that displays optical images as well as electronic images that have been electronically processed; and an MPU (micro processing unit) 57 that serves as a system controller to control the various members.

A camera module that is equivalent to the lens driving device 1 comprises mechanical parts of the lens driving device 1 consisting of the moving body 10 including the lens 13, the image capturing element 44, the zoom driver 51 and the ISP 52. The control logic section 54 and the MPU 57 constitute a control section. The image capturing element 44, the ISP 52 and the control section constitute an image capturing module. The MPU 57 can serve as a zoom instruction reading module for reading zoom instructions, an operational position confirmation module for confirming the operational position of the lens 13, and a current position detection module for detecting the position of the lens 13.

A sensor to detect the position of the lens 13, i.e., the position of the moving body 10, can be provided to constitute a part of the current position detection module; alternatively, instead of providing a special sensor, the first drive coil 28 and the second drive coil 30 may be used as sensors. In the latter case, the first and second drive coils 28 and 30 would constitute a part of the current position detection module.

The control logic section 54 may be built-in inside the MPU 57. The display unit 56 comprises a display device made of liquid crystal and a display driver to drive the display device. The display driver may be placed on the circuit substrate 45. The display device may be LED (light emitting diode) or EL (ElectroLuminescent), or other display device. If a plurality of memories 55 is provided as shown in FIG. 5, temporarily stored images can be used to perform smoother electronic processing (digital processing) in order to execute digital zooming or to make a composite from a plurality of images with different resolutions, as described later.

Next, referring to FIGS. 1 and 2, a method of assembling the lens driving device 1 according to the first embodiment will be described.

First, the rear end member 46, which is provided with the image capturing element 44, the circuit substrate 45 and the filter 43, is mounted and affixed to the base section 47. In the meantime, the first magnetic member 32 is inserted into and fixed to the cylindrical section 26 of the body 24. Next, the first drive coil 28 is placed together with the first magnetic member 32 and fixed. After this, the drive magnet 16 is affixed and the moving body 10, which has the lens 13 inside, is assembled to the cylindrical section 26.

Next, the second drive coil 30 is inserted into the cylindrical section 26 and fixed; the second magnetic member 34 is placed together with the second drive coil 30 and fixed. Next, the cover 42 is mounted on the cylindrical section 26 and temporarily fixed. In this state, the cylindrical section 26 is placed in the base section 47, the distance between the image capturing element 44 and the lens 13 is adjusted in such a way that a proper image can be captured when the lens 13 is in the wide angle position. When various members are in position to attain this state, an adhesive 48 is filled between the base section 47 and the cylindrical section 26 to fix them together.

Next, the cover 42 is moved back and forth in the direction of the optical axis 11 and fixed in a position with which a proper photographing is possible when the lens 13 is in the telephoto position. In other words, the cover 42 is moved back and forth against the cylindrical section 26 in the direction of the optical axis 11 in order to capture a proper telephoto image (an enlarged image) in the telephoto position when the front end surface 20 of the lens-barrel 12 hits the positioning protrusions 36, and the cover 42 and the cylindrical section 26 are fixed in proper positions with an adhesive. It is preferable for the positioning protrusions 36 to be provided in three locations at an interval of 120 degrees.

Figure 6:
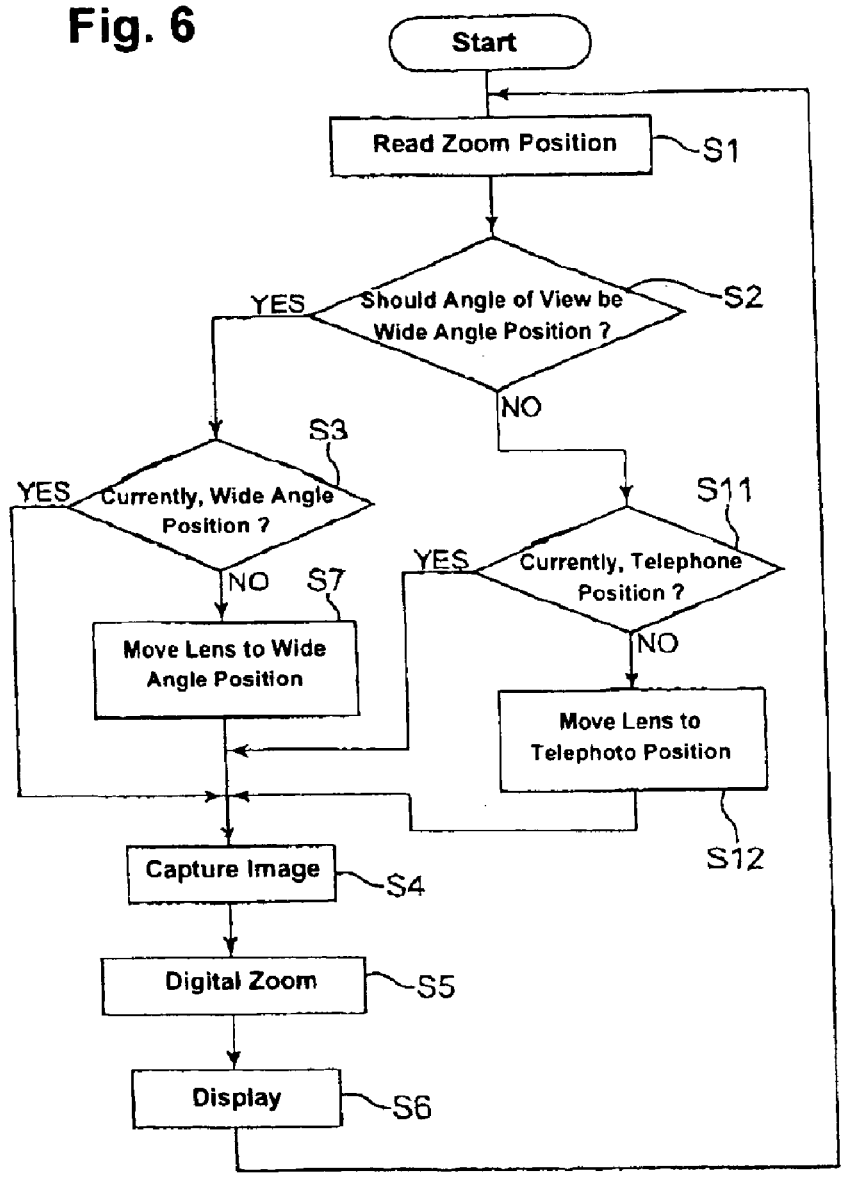
FIG. 6 is a flow chart of an operation for performing a digital zoom using the lens driving device in FIG. 1.

Next, referring to FIG. 6, one example of a method for performing a digital zooming using electronic images that have been electronically processed (digitally processed) is described. In this example, the magnification in the telephoto position is twice that in the wide angle position and a digital zooming of a further 2× magnification from the telephoto position is performed. For this reason, the telephoto position becomes the intermediate position in the digital zooming according to this method.

Optical images can be captured only at two positions: the wide angle position which is the first position and the telephoto position which is the second position. The optical images in these two positions are utilized to obtain enlarged zoom images that are digitally processed. The example in FIG. 6 can be executed even if there is only one memory 55; consequently, we will describe the following with the assumption that the camera 50 has only one memory 55.

The MPU 57 constantly reads zoom instructions given through the zoom switch (not shown). When the MPU 57 detects that a zoom instruction has been given, it reads in which position the moving body 10 should be set in terms of the operation of the camera (step S1). If the current position of the camera in terms of operation is at 1× magnification (i.e., in the wide angle position), the optical image to be captured is an image in the wide angle position (i.e., the first position); if the current position of the camera in terms of operation is at 2× magnification (i.e., in the telephoto position), the optical image to be captured is an image in the telephoto position (i.e., in the second position). For this reason, the MPU 57 in step S2 determines whether the angle of view should be the wide angle position. In other words, the MPU 57 determines if the lens position in terms of the camera operation is the wide angle position according to the zoom instruction issued. If the current position of the operation is 1× magnification (the wide angle position), the answer in step S2 becomes affirmative and the MPU 57 determines whether the current position of the lens 13 is the wide angle position (step S3). If the answer in step S3 is affirmative, the camera 50 captures an optical image in the wide angle position (step S4). The optical image captured in step S4 is stored in the memory 55.

Next, the MPU 57 activates the ISP 52, retrieves from the memory 55 the optical image captured, digitally processes the optical image, and performs a digital zooming (step S5). The MPU 57 forms images in frame numbers of several frames to 30 frames per second, which appear as gradually enlarging zoom images through electronic processing. In the electronic processing, if the optical image is 280×960 pixels, or approximately 1.22 million pixels, a 2× magnification reduces the pixels to 640×480 pixels, or approximately 300,000 pixels. Although the number of pixels becomes approximately one-fourth of the optical image, since the display area is the same when a 2× magnification image is displayed on the display unit 56, information on the 300,000 pixels is utilized to interpolate the display pixels when displaying in the 2× magnification.

Pixel interpolation can be performed using the zero-order hold method, in which each of the 300,000 pixels is aligned in quadrupled regions, or the linear interpolation method, in which new pixels for the enlargement are created through linear approximation between adjacent pixels of the original image (i.e., the part comprising 300,000 pixels). However, regardless of the interpolation method used, the image quality may be grainy when the to interpolated image is displayed on the display unit 56 (step S6), since the original image has a fewer number of pixels to begin with.

After the zoom image is displayed, the process returns to step S1 following a predetermined amount of time. It is desirable for the predetermined amount of time to be a value greater than 5 msec and a time during which panning while photographing would not appear awkward. Specifically, 10–100 msec may be desirable, and 20–50 msec may be even more desirable. Since an optical image is captured once again in the wide angle position after digital zoom images are displayed in step S6, proper images are obtained in panning photograph. In this way, enlarged zoom images that are gradually enlarged through the digital zooming continue to be displayed on the display unit 56.

In step S3, if the answer is negative, the MPU 57 instructs the zoom driver 51 to move the moving body 10, i.e., the lens 13, to the wide angle position (step S7). Subsequent to this, processing in steps S4, S5, S6, S1, S2, S3, S4, follows and the MPU 57 continues to display enlarged zoom images through digital zooming on the display unit 56.

If the current operational position is the telephoto position (i.e., the intermediate position), the MPU 57 makes a negative judgment in step S2 and proceeds to step S11. In step S11, the MPU 57 determines whether the current position of the lens 13 is the telephoto position. If the answer is affirmative, the MPU 57 controls the image capturing element 44 and captures an optical image in the telephoto position (step S4). After this, the MPU 57 uses the optical image in the telephoto position but otherwise performs the processing in steps S5 and S6 as in the prior case, and repeats steps S1, S2, S11, S4. As a result, gradually enlarging images continue to be displayed as electronic images through digital zooming of greater than 2× magnification.

If the answer in step S11 is negative, the MPU 57 instructs the zoom driver 61 to move the moving body 10, i.e. the lens 13, to the telephoto position (step S12). Next, the MPU 57 goes through the steps S4, S5, S6 to display an electronic image of greater than 2× magnification, and repeats steps S1, S2, S1, S4, S5, S6, to continue to display gradually enlarging electronic images through digital zooming on the display unit 56.

If the zoom instruction is for a 2× magnification or a magnification greater than 2×, in addition to the optical image in the wide angle position, an optical image in the telephoto position is captured when the magnification of the digital zooming reaches 2×, and the 2× magnification optical image instead of an electronic image is displayed on the display unit 56 for the 2× magnification display. This causes the number of pixels immediately before the 2× magnification to be one-fourth of the original number of pixels, but the number of pixels returns to the original full number in the 2× magnification, which means that the image quality is excellent. Furthermore, since the subsequent digital zooming is made by electronically processing the optical image captured in the telephoto position in which the original image quality has been restored, the deterioration of the image quality is prevented to a large extent.

If a zoom instruction is issued when the zooming position in terms of camera operation is at 2× magnification, i.e., when the current position of the lens 13 in terms of camera operation is indicated as the telephoto position, instead of proceeding from step S2 to step S3, zooming begins from the telephoto position; consequently, digital zooming is executed by repeating steps S2, S11, (S12), S4, S5, S6, S1, S2, S11, S4. The position of the lens 13 is detected in steps S3 and S11; however, if a sensing mechanism is not provided, the processing may be set to always proceed to step S7 if the answer in step S2 is affirmative, and the processing may be set to always proceed to step S12 if the answer in step S2 is negative.

Figure 7:
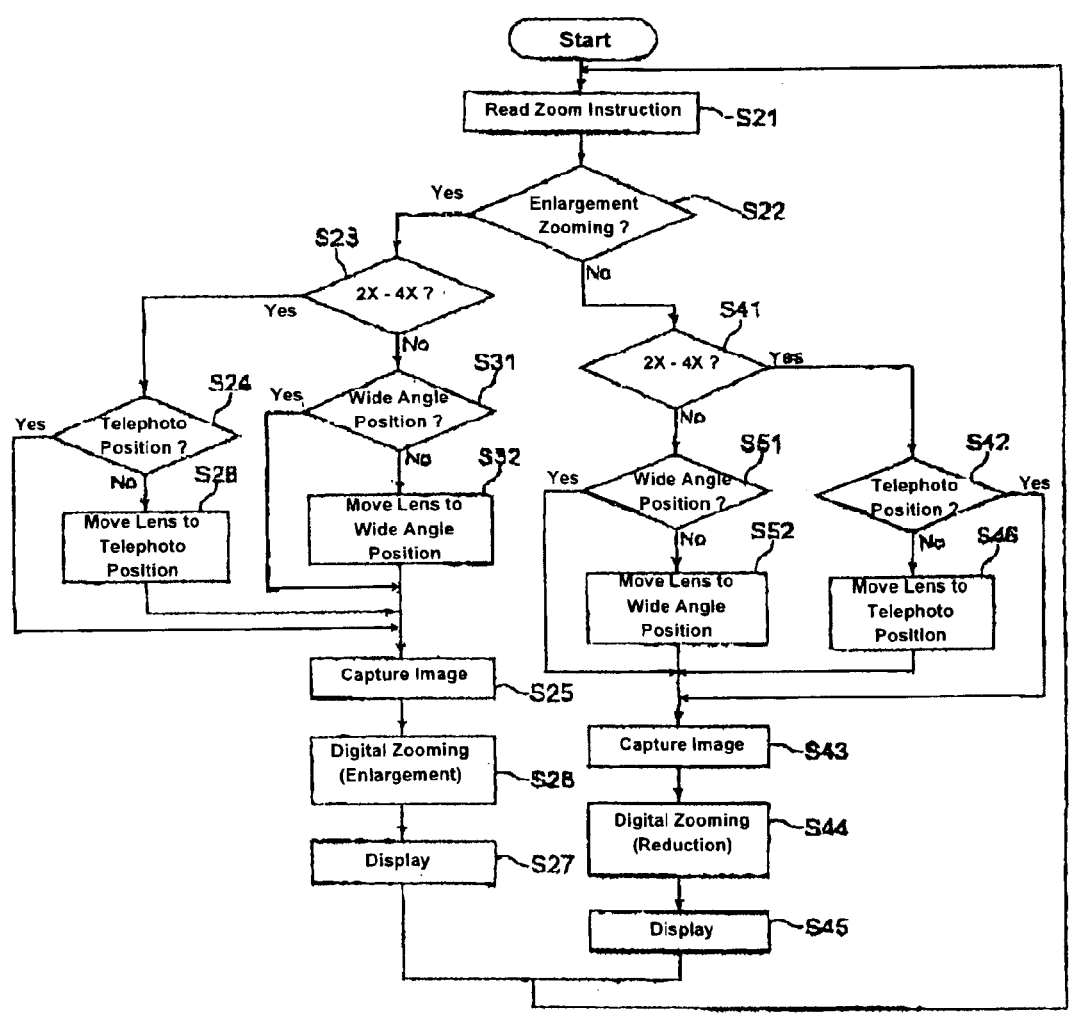
FIG. 7 is a flow chart of another example of an operation for performing a digital zoom using the lens driving device in FIG. 1.

Next, with reference to FIG. 7, another method for performing a digital zooming using electronic images that have been electronically processed is described. This is an example of enlargement zooming, as well as an example of reduction zooming.

The MPU 57 reads a zoom instruction (either an enlargement zooming or a reduction zooming) given through the zoom switch (not shown) (step S21). Next, the MPU 57 detects whether the zoom instruction that was read is for an enlargement zooming (step S22). If it is for an enlargement zooming, the MPU 57 proceeds to step S23 and determines whether the zoom instruction is within the range of 2×–4× magnification (step S23). If the determination made is affirmative, the MPU 57 detects whether the current position of the lens 13 is the telephoto position (the second position) (step S24); if the answer is affirmative, the MPU 57 proceeds to step S25 where an optical image in the telephoto position is captured. Next, the MPU 57 proceeds to steps S26 and S27, which are the same as the prior steps S5 and S6, and shows on the display unit 56 a zoom image that has been enlarged through digital zooming.

If the answer in step S24 is negative, i.e., if the lens 13 is not in the telephoto position, the MPU 57 proceeds to step S28, where the moving body 10 is driven to the telephoto position (2× magnification) side accordingly. Following this, an optical image in the telephoto position is captured in step S25. Next, the MPU 57 proceeds to steps S26 and S27 and shows on the display unit 56 a zoom image that has been enlarged through digital zooming.

If the answer in step S23 is negative, i.e., if the zoom instruction is for 1×–2× magnification, the MPU 57 detects whether the lens 13 is in the wide angle position (step S31).

If the lens 13 is in the wide angle position, the MPU 57 proceeds to step S25, where an optical image in the wide angle position (1× magnification) is captured. Next, the MPU 57 proceeds to steps S26 and S27 and shows on the display unit 56 a zoom image that has been enlarged through digital zooming.

If in step S31 the MPU 57 determines that the lens 13 is not in the wide angle position, the MPU 57 instructs the zoom driver 51 to move the lens 13, i.e., the moving body 10, to the wide angle position (1× position). Next, the camera 50 photographs an optical image in the wide angle position; the processing proceeds to steps S26 and S27, and further on to steps S21, S22, S23, S31 and S25, so that gradually zooming images in 1×–2× digital zooming continue to be displayed on the display unit 56.

If in step S22 the MPU 57 determines that the zoom instruction is not for an enlargement zooming, i.e., if a reduction zooming is instructed, the MPU 57 determines whether the zoom instruction starts within the range of 2×–4× magnification (step S41). If the answer is affirmative, the MPU 57 determines whether the position of the lens 13 is the telephoto position (step S42). If the lens 13 is in the telephoto position, an optical image in the telephoto position (2× magnification) is captured (step S43). An enlarged image (an image in magnification greater than 2× magnification) as currently designated is created using the optical image captured in the telephoto position, and reduced zoom images that follow are also created using the optical image (step S44). The electronic images created are displayed on the display unit 56 (step S45).

The enlarged image in step S44 is created through the zero-order hold method or the linear interpolation method discussed earlier. The reduction of images starting from the enlarged image that is executed in step S44 uses as its initial image an enlarged image of the optical image captured in the telephoto position. As a result, the reduction zooming that takes place in step S44 is in fact a gradual return to the original optical image from the enlarged image.

In the zero-order hold method and the linear interpolation method that are used for image enlargement, an image size is enlarged in integer multiples. To enlarge images in non-integer multiples, a downsampling method and an averaging operation method are combined to reduce an image size to a fraction of an integer. For example, if the reduction rate is ⅔, the image is first magnified 4× then reduced to ⅓, which results in an image that is ⅔ of the original image size.

If the lens 13 is determined, in step S42, not to be in the telephoto position, the MPU 57 drives the moving body 10 to move the moving body 10 to the telephoto position side (step S46). Next, the processing proceeds to steps S43, S44 and S45, where a reduced zoom image is displayed on the display unit 56; the processing then returns to S21 and goes through a similar process to display further reducing zoom images. In this way, the MPU 57 continues to display gradually reducing zoom images on the display unit 56. This display continues until the magnification reaches 2×. When the magnification becomes 2× (i.e., the magnification in the telephoto position), the optical image that has been photographed is read from the memory 55 and displayed on the display unit 56.

If the reduction zooming is to start at less than 2× magnification, the answer in step S41 becomes negative and the MPU 57 determines whether the lens 13 is in the wide angle position (step S61). If the answer is affirmative, an optical image is captured in the wide angle position (step S43). Subsequently, the processing proceeds to steps S44 and S45, where reduction zooming from less than 2× to 1× magnification takes place.

If in step S51 the MPU 57 determines that the lens 13 is not in the wide angle position, the MPU 57 drives the lens 13, i.e. the moving body 10, to move the lens 13 to the wide angle position (step S52). Subsequently, the processing proceeds to steps S43, S44, S45, S21, S22, S41, S51, S43, S44, whereby the MPU 57 uses the optical image in the wide angle position to create reduced zoom images and continuously displays gradually reducing zoom images on the display unit 56.

According to the method shown in FIG. 7, when performing a reduction zooming, an optical image at a lower magnification than the final magnification is captured in advance and enlarged images of the optical image are created through electronically processing the optical image. As a result, the reduced zoom images have good image quality, like the enlarged zoom images.

Figure 8:
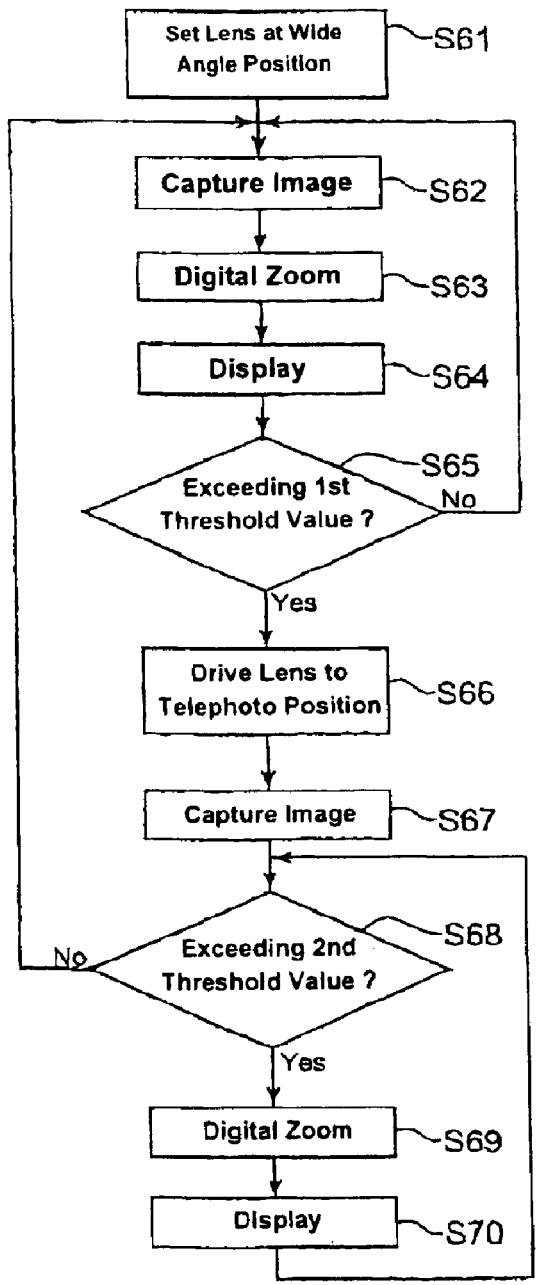
FIG. 8 is a flow chart of another example of an operation for performing a digital zoom using the lens driving device in FIG. 1.

Next, another method for digital zooming will be described with reference to FIGS. 8 through 10. According to this method, when performing an enlargement digital zooming, a first optical image as well as a second optical image enlarged in a different magnification are utilized; when performing a reduction digital zooming, in addition to the second optical image, which is an optical image in an intermediate magnification between the initial and final magnifications is utilized. Through this, the image quality of both is improved. In this example, since two optical images are used, at least two memories 55 are required in the camera 50.

First, an enlargement zooming operation is described with reference to FIG. 8. First, the MPU 57 sets the lens 13 to the wide angle position (step S61). Next, the MPU 57 captures an optical image in the wide angle position (step S62). The optical image is stored in the memory 55a. The MPU 57 uses the optical image to create a zoom image in digital zooming (step S63), and displays the zoom image on the display unit 56 (step S64).

Next, the MPU 57 determines whether the digitally processed electronic image has exceeded a predetermined threshold (a first threshold), i.e. a predetermined magnification (step S65). In this example, 1.7× magnification, i.e. a position in which the magnification in the wide angle position and the magnification in the telephoto position are divided 7:3, is set as the predetermined threshold. Consequently, as long as the magnification of the electronic image does not exceed 1.7×, the processing returns to step S62 to repeat photographing and to continue to display enlarged images based on the optical image captured in the wide angle position.

If the magnification reaches 1.7× in step S65, the processing proceeds to step S66, where the MPU 57 drives the lens 13 to the telephoto position. An optical image is photographed in the telephoto position (step S67), and the image is stored in the memory 55b. Next, the electronic magnification increases further and the MPU 57 determines if a predetermined threshold (a second threshold) has been exceeded (step S68). Since the first threshold was 1.7×, a magnification greater than 1.7× will be used as the second threshold in this example. For example, 1.8× will be used as the second threshold.

If the magnification does not exceed the second threshold in step S68, the processing returns to step S62, and digital zooming utilizing the latest optical image captured in the wide angle position continues to take place. On the other hand, if the magnification does exceed the second threshold in step S68, the MPU 57 utilizes the optical image captured in the telephoto position that was stored in the memory 55b to obtain zoom images in digital zooming (step S69). In this case, the optical image in the memory 55a may also be used in conjunction, as described later.

Next, an electronically processed image is displayed on the display unit 56 in step S70, and the processing returns to step S67 and proceeds to steps S68, S69 and S70 to continue to display enlarging electronic images using the latest optical image captured in the telephoto position.

In this way, according to this example, electronic images between 1.8× to 2× magnification are created by using an optical image in the telephoto position (2× magnification position). When an optical image in the wide angle position is electronically processed and enlarged to nearly 2×, the number of pixels reduces to approximately one-fourth. This causes the image quality to deteriorate; however, since enlarged electronic images in 1.8× or greater magnification, which are created using an optical image captured in the telephoto position, have the same number of pixels as that of the original optical image, the deterioration of the image quality can be prevented to a large extent.

Figure 9:
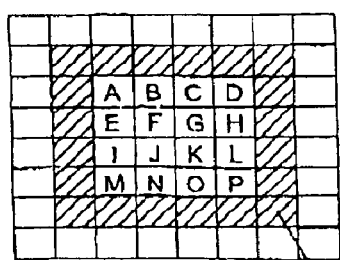
FIGS. 9(a)–9(c) are diagrams illustrating an example of an electronic image as a composite that is formed by the operational flow in FIG. 8.
Figure 9:
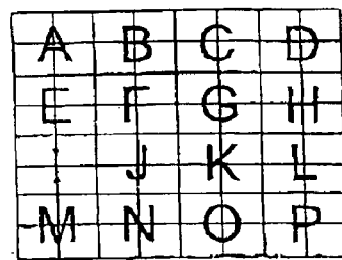
Figure 9:
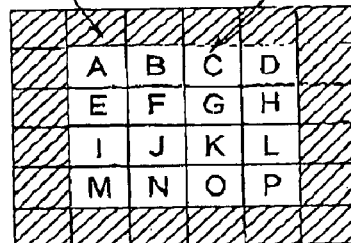

Due to the fact that the angle of view is narrow in the telephoto position, when an optical image in the telephoto position is used to create a 1.8× magnification image, the resulting image lacks information on its periphery, as indicated in FIG. 9(a). To address this issue, it is preferable to obtain a 1.8× magnification electronic image by slightly reducing the optical image captured in the telephoto position (FIG. 9(b)) and placing it in the center of the display screen, while pasting on the periphery of the display screen an image that has been enlarged from an optical image in the wide angle position, thereby creating a composite image, as indicated in FIG. 9(c). Examples in FIGS. 9 and 10 describe the concept of creating an image and are not meant to be an absolute assurance that a 1.8× magnification image would actually be an image as shown in FIG. 9 or 10.

When an optical image captured in the telephoto position is used, there is a discrepancy in the angle of view of the optical image captured through photographing and a display region displayed on the display unit 56. If the former is wider, only the optical image captured in the telephoto position (FIG. 10(b)) is used without using the optical image captured in the wide angle position (FIG. 10(a)) in order to display an image with 1.8× magnification or greater. In other words, if the display region is narrower than the region of the optical image captured in each position (as indicated in FIG. 10(d)), the size of an image that is slightly reduced (a 1.8× magnification image) from the optical image captured in the telephoto position generally becomes the same size as the size of the display region, so that a 1.8× magnification image (FIG. 10(e)) can be obtained solely from the optical image captured in the telephoto position.

When the magnification increases to 2×, the MPU 57 uses the optical image captured in the telephoto position unaltered and displays it as the 2× magnification image (i.e., the image in the telephoto position) on the display unit 56. When the magnification exceeds 2× magnification, the processing repeats each of the steps S67, S68, S69, S70, S67. In this case, enlarged electronic images are created using the optical image captured in the telephoto position. This makes it possible to perform a digital zooming exceeding 2× magnification and up to 4× magnification.

Through the above, an enlargement zooming from the wide angle position (1× magnification) to the telephoto position (2× magnification), as ell as further enlargement zooming from the telephoto position to a 4× mage (2× to 4× magnification), can be obtained. Images between 1× and 0.8× magnification are called first zoom images, while images between 1.8× and 2× magnification are called second zoom images.

The enlargement zooming concept described above can also be applied to reduction zooming. In other words, a reduction zooming from a magnification of over 2× to 2× magnification is achieved by digitally processing an optical image captured in the telephoto position. This is the same as the earlier example shown in FIG. 7. When the magnification is less than 2× magnification, only an optical image captured in the wide angle position is used in the digital processing to perform a reduction zooming according to the example in FIG. 7. However, for the second zoom image region in which the magnification × is defined by 1.8<×<2.0, an optical image captured in the telephoto position in addition to an optical image captured in the wide angle position can be used. The image processing in this case can be performed by using the method shown in FIGS. 9 and 10.

For the first zoom image region in which the magnification × is defined by ×<1.8, only the optical image captured in the wide angle position is used to create images to be displayed. In such electronic processing, although employing two thresholds is desirable for enlargement zooming, employing only one threshold is often sufficient for reduction zooming since an optical mage in the telephoto position is already captured.

Figure 11:
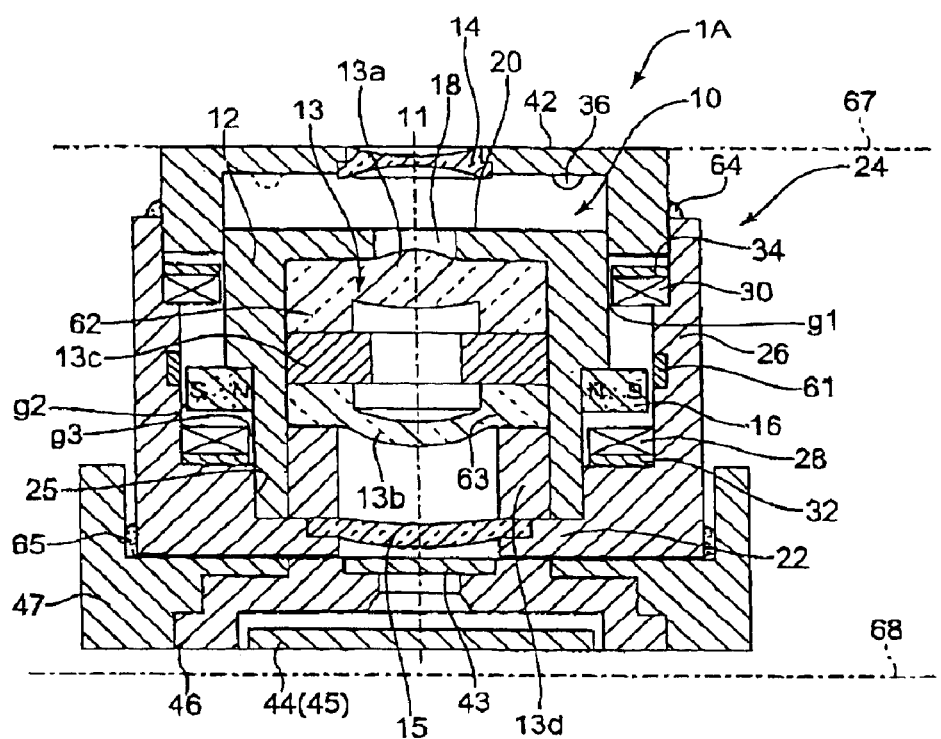
FIG. 11 is a cross-sectional view of a lens driving device in accordance with a second embodiment of the present invention that is to be assembled into a camera.

Next, a lens driving device 1A in accordance with a second embodiment of the present invention will be described with reference to FIG. 11. The basic configuration of the lens driving device 1A is generally the me as that of the lens driving device 1. Accordingly, like components are assigned the same reference numbers and their description is omitted, and different features will be primarily described below.

In the lens driving device 1A, a ring-shaped third magnetic member 61 is placed between a first drive coil 28 and a second drive coil 30 to make it possible to stop and hold a drive magnet 16 at a point along its movement in the direction of an optical axis 11. In other words, this makes a three-position step drive possible. To explain this using a specific example, in addition to two positions of a wide angle position and a telephoto position, there is another position at which photographing in an intermediate magnification between the two is possible. By placing not one but a plurality of the third magnetic members 61 in between, a drive of four steps or more becomes possible. Furthermore, although a lens 15, which is a third lens group, is indicated as fixed and immovable in the direction of the optical axis 11 in FIG. 11, the lens 15 in fact is slightly movable in the direction of the optical axis 11 due to a reason described later.

Unlike the first embodiment, a lens 13, which is a second lens group, comprises two lenses, a subject side lens 13a and a body side lens 13b, in the lens driving device 1A. The subject side lens 13a is an aspherical lens that is molded with resin in a unitary fashion with a frame section 62, and the camera body side lens 13b is also an aspherical lens that is molded with resin in a unitary fashion with a frame section 63. Between the lenses 13a and 13b is placed a space maintaining member (i.e., spacer member) 13c, and even more towards the inner end than the camera body side lens 13b is fixed a position fixing member 13d to a cylindrical section 26 in order to position the lenses 13a and 13b. A cover 42 and the cylindrical section 26 are affixed to each other with adhesive 64, while the cylindrical section 26 and a base section 47 are affixed with adhesive 65.

As in the first embodiment, a gap g1 is formed between the outer circumference of a lens-barrel 12 and the inner circumferences of the second drive coil 30 and a second magnetic member 34, a gap g2 is formed between the outer circumference of the drive magnet 16 and the inner circumference of the cylindrical section 26, and a gap g3 is formed between the outer circumference of the lens-barrel 12 and the inner circumferences of the first drive coil 28 and a first magnetic member 32. In the lens driving device 1A, the gaps g1, g2 and g3 have relations of g3>g2 and g3>g1. Furthermore, it is desirable for the gaps g1 and g2 to have a relation of g2>g1.

Also, the lens driving device 1F is disposed in portable equipment such as a portable telephone, such that a case front surface 67 of the portable telephone is flush or generally flush with a surface of the cover 42. Furthermore, an image capturing element 44 and a circuit substrate 45 are positioned between a case rear surface 68 of the portable telephone and the lens 15. As a result, an ample space is provided on the outer circumference part of the lens driving device 1A, such that the lens driving device 1A can be readily assembled into portable equipment. The case front surface 67 and the case rear surface 68 are not shown in other drawings but have positional relationships similar to the ones shown in FIG. 11 in every instance.

Due to the fact that positions can be held at three points in the lens driving device 1A according to the second embodiment, the resulting zooming can be a so-called three-stage zooming. Compared to the two-stage zooming with the lens driving device 1 according to the first embodiment, the deterioration of image quality can be further prevented with the three-stage zooming.

Figure 12:
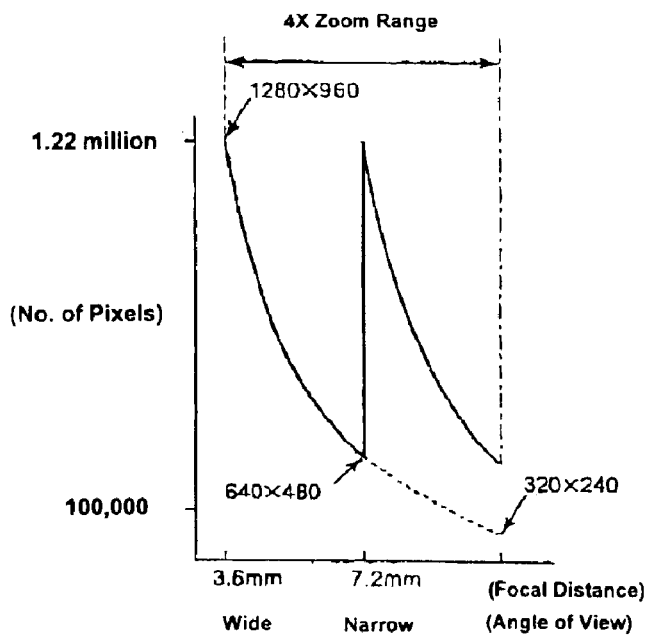
Figure 12:
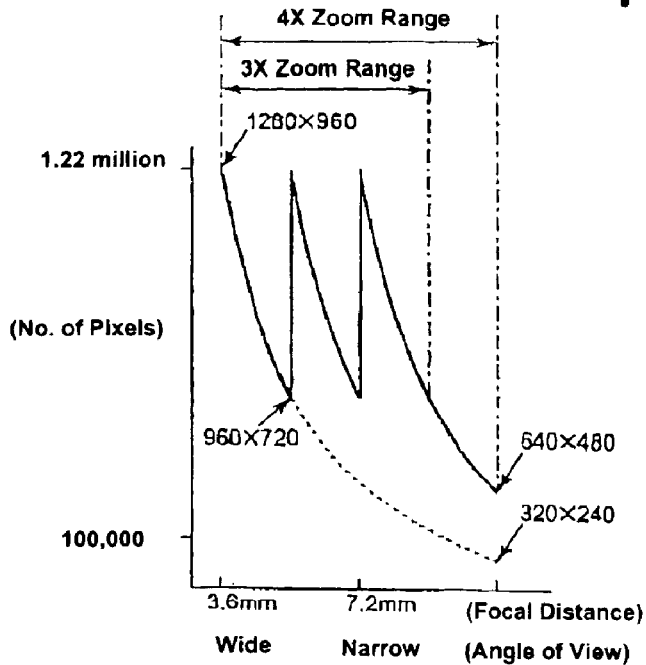

Referring to FIGS. 12(a) and 12(b), how the image quality is prevented from deteriorating in a three-stage zooming, in other words, how the image quality in a three-stage zooming can be improved compared to a two-stage zooming will be described. FIG. 12(a) is a diagram indicating changes in the number of pixels in a two-stage zooming (i.e., in the lens driving device 1 according to the first embodiment), while FIG. 12(b) is a diagram indicating changes in the number of pixels in a three-stage zooming (i.e., the lens driving device 1A according to the second embodiment). In both, the vertical axis indicates the number of pixels displayed and the horizontal axis indicates the focal length (which corresponds to the angle of view). When the focal length is 3.6 mm, where the angle of view is wide, the position is the wide angle position in both embodiments. When the focal length is 7.2 mm, where the angle of view is narrow, the position is the telephoto position. In FIGS. 12(a) and 12(b), a digital zooming instead of an optical zooming is performed between the two optical positions, i.e., in the range of 3.6 mm to 7.2 mm.

Due to the fact that only a single optical image captured in the wide angle position is used for zoom processing when using a single focus lens (a short focus only), the number of pixels that is initially approximately 1.22 million pixels is reduced to one-sixteenth in a 4× zooming to approximately 77,000 pixels. With the lens driving device 1 having two focal points, the number of pixels reduces to one-fourth through a 2× zooming to approximately 300,000 pixels, but returns to the original number of pixels at the 2× magnification, where once again an optical image of 1.22 million pixels is captured, as shown in FIG. 12(a). Since this image is used in the digital zooming of further 2× magnification, the final point in the 4× zooming results again in a reduction to one-fourth of the number of pixels of the optical image. As a result, the deterioration of image quality can be reduced to a large extent with the two-stage zooming compared to the deterioration with a fixed focus.

In contrast to the two-stage zooming, an optical image can be captured at an intermediate point where the focal length is 5.4 mm with the three-stage zooming. This optical image has a 1.5× magnification. Consequently, the number of pixels reduce from 1× to 1.5× magnification, so that the number of pixels at 1.5× magnification is approximately 690,000 pixels, which is approximately half of the original number of pixels; however, since an optical image is captured again at this point, the number of pixels returns to the original 1.22 million pixels. Subsequently, the number of pixels reduces as before up to the magnification of 2× magnification, but the umber of pixels returns to the original number of pixels at the 2× magnification.

Although there is a reduction in the number of pixels during digital zooming, the reduction can be restricted to approximately half of the number of pixels of the optical image in the range of 1×–3× magnification with the three-stage zooming. Consequently, the resulting image quality is more than twice as better than that of the two-stage zooming. In the range of magnification exceeding 2×, the image quality with the two-stage zooming is the same as the image quality with the three-stage zooming.

When the lens 13 is stopped in an intermediate position between the wide angle position and the telephoto position, the lens 15, which is the third lens group, also needs to be driven in two stages in the direction of the optical axis 11. This is due to the fact that movement loci 71, 72 and 73 of the lenses 13, 14 and 15, respectively, differ, and the movement locus 73 of the lens 15, which is the third lens group, is in the same position for the wide angle position and the telephoto position but is towards the inner side (towards the image capturing element 44) than these two positions in an intermediate position m, as shown in FIG. 13(b).

Figure 13:
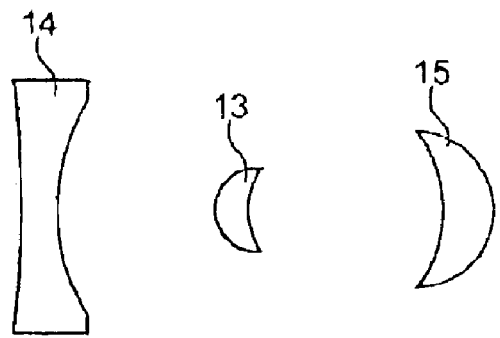
FIGS. 13(a) and (b) are diagrams illustrating positional relationship in the optical axis direction of various lenses in the lens driving device in FIG. 11, and their movements.
Figure 13:
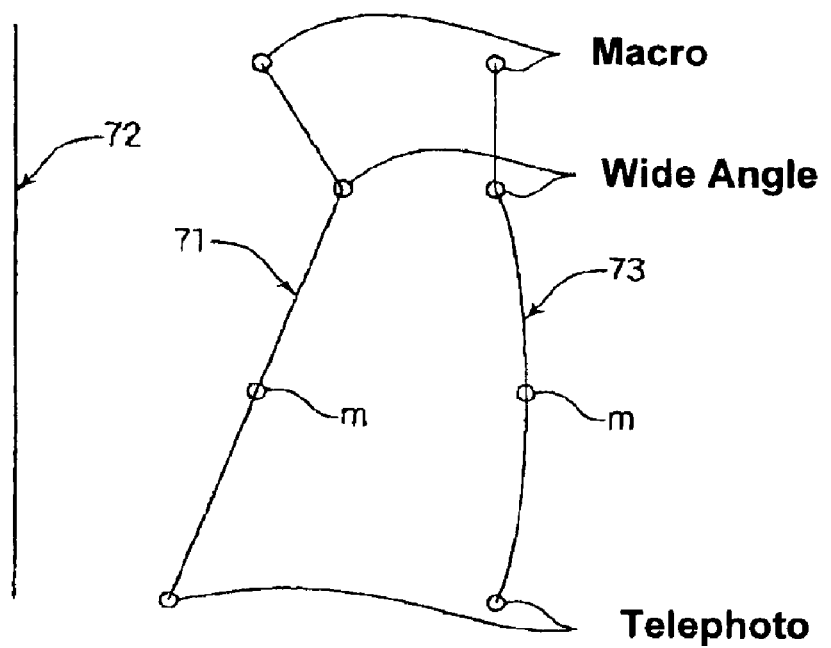

As shown in FIG. 13(b), the position of the lens 15, which the third lens group, for the macro position (close-up position) is the same position as for the wide angle and telephoto positions. Consequently, in order to add a macro function to the lens driving device 1 according to the first embodiment, the lens driving device 1A according to the second embodiment may have an additional function to stop in the intermediate point. In this case, the lens 15 can be fixed and be immovable in the direction of the optical axis 11.

Although the embodiments according to the present invention described above are preferred embodiments of the present invention, many modifications can be made without departing from the present invention. For example, although the cylindrical lens-barrel 12 is indicated as a lens holder, a lens holder can be provided in a unitary fashion with a lens and made of the same resin material as the lens, instead of providing a lens holder separate from the lens.

Although a magnetic drive comprising magnets and coils is preferable as a driving device, other driving device can also be used, such as a driving device in which rotational motion is converted into linear motion by utilizing a motor; or a driving device in which a guide groove is provided on the inner circumference of a motor rotor, and a guide member is provided to insert a protrusion of a lens holder into the groove, impede the lens holder from rotating, and allow movement only in the optical axis direction, so that the lens holder is allowed to move in the optical axis direction by the rotation of the rotor.

Furthermore, although the first and second drive coils 28 and 30 as a driving device are provided to surround the lens-barrel 12, which serves as a lens holder, a lens holder can be placed instead in such a manner that it would surround a driving device. In addition, although the drive magnets 16 is magnetized with N and S poles in the radial direction, it may be magnetized with N and S poles in the direction of the optical axis 11.

In addition to methods described for image enlargement and reduction processing, a method that uses digital filters can be employed. By combining an upsampler and a downsampler with the digital filter, various enlargements and reductions can be made. When storing image data in the memory 55, a compression processing can be performed for storage. This will require a smaller capacity for the memory 55. However, if compression is used, a decode processing would be required.

Figure 14:
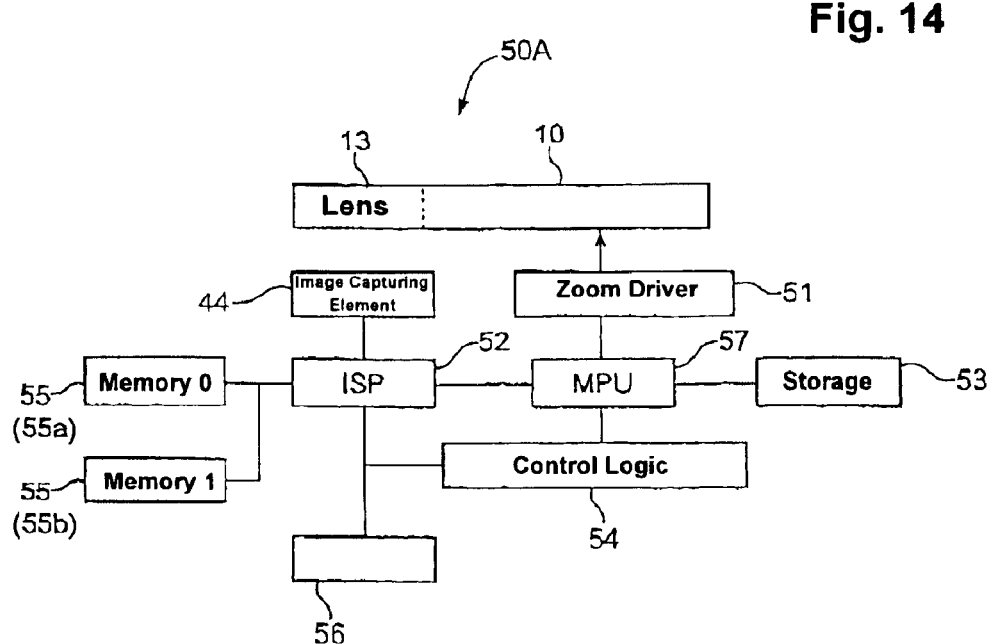
FIG. 14 is a block diagram of the system configuration of another example of a camera in accordance with an embodiment of the present invention.

The camera 50 may be configured like a camera 50A shown in FIG. 14. The camera 50A places memories 55 on a camera module side to achieve high-speed image processing by an ISP 52 and to avoid interference with system control by an MPU 57.

When an image photographed in an optical zoom position (the wide angle position, the telephoto position or the intermediate position according to the above examples) is enlarged through electronic processing, the enlargement rate or image size (i.e., the number of pixels) may be displayed on the display unit 56. With such a configuration, a user of the portable equipment would be able to ascertain image information when photographing, which would further enhance the ability to capture proper images. To display the enlargement rate in such a display, for example, an optical image can be assigned the number "0" and various degrees of image quality deterioration can be displayed in negative values, thereby indicating that the image quality obtained at "0" is the best image quality.

As an application of the two-stage zooming or three-stage zooming described above, if a display unit mounted on portable equipment has lower resolution than the resolution of images photographed by the lens driving device 1 or 1A, images can be displayed on the display unit in a resolution level similar to that of the display unit, while images can be image-processed in high resolution only when a shutter is pressed. In other words, when the shutter is not pressed, all images displayed on the display unit are electronic images that have been electronically processed, i.e. images with inferior image quality, and an optical image is captured only when necessary, i.e., only when the shutter is pressed, so that an image with improved image quality is captured by the image capturing element 44 and displayed on the display unit. This would make it possible to use relatively low speed MPU or CPU (central processing unit) and to achieve low power consumption.

Furthermore, zooming in four stages or more is also possible. The total magnification or special digital zooming ranges, such as according to the present invention, can be values that are different from the values indicated in the embodiments. In a three-stage or greater zooming, the final stage zooming can be set to normal digital zooming only, but an optical image can be set for capture in the final position of the final stage zooming without performing any further digital zooming. Normal continuous optical zooming can be performed up to a predetermined magnification or within a predetermined range of magnifications, so that a zooming in which an optical image is added to digital zooming according to the present invention can be performed in other ranges; furthermore, in addition to an optical zooming and zooming according to the present invention, a pure digital zooming (a zooming that exceeds 2× magnification shown in the embodiments) can be added to create a lens driving device having three different types of zooming.

The present invention can be applied to camera devices. It can also be applied to other portable equipment such as portable telephones with camera function. Furthermore, the present invention can be assembled in any electronic equipment that has a lens zooming mechanism.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A camera comprising:
    a lens driving device including a lens holder that holds a lens and a driving device that moves the lens holder in an optical axis of the lens, wherein the driving device includes a drive coil and a drive magnet for moving the lens holder, and wherein the lens holder is intermittently stoppable at least at two predetermined stop positions in the optical axis direction of the lens and is unable to stop other than said at least two predetermined stop positions by means of the magnetic action between the drive coil and the drive magnet; and
    an image obtaining device that captures optical images of different magnifications at the at least two predetermined stop positions, and obtains electronic zoom images between said at least two predetermined stop positions based on the captured optical images at the at least two predetermined stop positions.

2. A camera according to claim 1, wherein the lens driving device moves the lens holder to two positions, and the image obtaining device captures first and second optical images of different magnification at the two positions, and obtains zoom images between the first and second optical images based on the first optical image and electronic images generated based on the first optical image.

3. A camera according to claim 1, wherein the image obtaining device obtains at least a wide angle image at a wide angle position, a telephoto image at a telephoto position and an intermediate image at an intermediate position between the wide angle position and the telephoto position, and the image obtaining device generates enlarged zoom images up to immediately before the intermediate position through processing the wide angle image and obtains enlarged zoom images past the intermediate position and up to the telephoto position through processing the image captured at the intermediate position.

4. A camera according to claim 1, wherein the wide angle image and the intermediate image are a wide angle optical image and an intermediate optical image captured by the image obtaining device, respectively, and the image obtaining device electronically processes the wide angle optical image and the intermediate optical image to obtain the zoom Images.

5. A camera according to claim 1, wherein the image obtaining device obtains zoom images between one of the optical images and the other of the optical images based on both of the optical images and electronic images generated based on both of the optical images.

6. A camera according to claim 1, wherein the image obtaining device obtains enlarged zoom images based on one of the optical images and reduced zoom images based on the other of the optical images.

7. A camera according to claim 4, wherein the image obtaining device obtains zoom images between the wide angle optical image and the intermediate optical image, wherein the zoom images include enlarged zoom images generated based on the wide angle optical image and reduced zoom images generated based on the intermediate optical image.

8. A camera according to claim 1, wherein the lens driving device stops the lens holder only at two places, and the image obtaining device captures the optical images at the two places.

9. A camera comprising:
    a lens driving device having a lens holder that holds a lens, and a driving device that moves the lens holder in an optical axis of the lens, wherein the driving device includes a drive coil and a drive magnet for moving the lens holder; and
    an image obtaining device that obtains zoom images at least through continuous image processing between a wide angle position and a telephoto position of different magnifications,
    wherein the lens holder is intermittently stopped at least at two predetermined stop positions to capture an optical image at the wide angle position and an optical image at the intermediate position, and wherein the lens holder is unable to stop other than said at least two predetermined stop positions by means of the magnetic action between the drive coil and the drive magnet, and wherein the image obtaining device obtains enlarged zoom images past the wide angle position and up to immediately before the intermediate position through electronically processing the optical image taken at the wide angle position and obtains enlarged zoom images past the intermediate position and up to the telephoto position through electronically processing the optical image taken at the intermediate position.

10. A camera according to claim 9, wherein the lens driving device stops the lens holder only at the wide angle position and the intermediate position, and the image obtaining device captures the optical images at the wide angle position and the intermediate position.

11. A camera according to claim 9, wherein the image obtaining device obtains enlarged zoom images between the wide angle position and the intermediate position through electronically processing the optical images captured at the wide angle position and the intermediate position.

12. A camera according to claim 11, wherein the image obtaining device further obtains enlarged images based on the optical image taken at the intermediate position and electronic images obtained through electronically processing the optical image taken at the intermediate position.

13. A camera comprising:
    a lens driving device including a lens holder that holds a lens and a driving device that moves the lens holder in an optical axis of the lens, wherein the driving device includes a drive coil and a drive magnet for moving the lens holder, and wherein the lens holder is intermittently stoppable at least at a first position on a wide angle side and a second position on a telephoto side that provides a magnification greater than a magnification on the wide angle side, and wherein the lens holder is unable to stop other than at least at said first and second predetermined stop positions by means of the magnetic action between the drive coil and the drive magnet; and an image obtaining device that captures optical images with different magnifications and obtains zoom images between one of the optical images and another of the optical images based on the optical images with different magnifications and electronic images obtained by electronically processing the optical images, wherein the image obtaining device captures an optical image at the first position and uses the optical image captured to form enlarged zoom images when an image enlargement zooming between the first and second positions is instructed, and captures an optical image at the first position and uses the optical image captured to form reduced zoom images when an image reduction zooming between the first and second positions is instructed.

14. A camera according to claim 13, wherein the image obtaining device includes a zoom instruction read device that reads a zoom instruction and an operational position confirmation device that confirms an operation position of the lens required for the zoom instruction.

15. A camera according to claim 14, wherein the lens holder is driven by the lens driving device to the operation position confirmed by the operational position confirmation device.

16. A camera according to claim 14, wherein the lens holder is not driven by the lens driving device when the operation position confirmed by the operational position confirmation device is a current position of the lens.

17. A camera according to claim 14, wherein the image obtaining device includes a current position detection device that detects a current position of the lens, and when the operation position is on the wide angle side, the current position detection device detects whether the current position of the lens is the first position, and the lens driving device moves the lens to the first position to capture an optical image when the current position is not the first position, and does not move the lens such that the lens remains unmoved to capture an optical image if the current position is the first position.

18. A camera according to claim 17, wherein, when the operational position is on the telephoto side, the current position detection device detects whether the current position of the lens is the second position, and the lens driving device moves the lens to the second position when the current position is not the second position, and does not move the lens such the lens remains unmoved to capture an optical image when the current position is the second position.

19. A camera according to claim 14, wherein, when the zoom instruction read device receives a zoom instruction of an image zooming with an enlargement magnification, the image obtaining device moves the lens to the second position before the enlargement magnification reaches the optical magnification in the second position, captures an optical image in the second position in advance, then forms an image for displaying a second enlargement zoom image formed base on the optical image captured in the second position after displaying a first enlargement zoom image formed base on the optical image captured in the first position, such that enlarged zoom images between the first position and the second position are obtained based on the first zoom image and the second zoom image.

20. A camera according to claim 19, wherein the second zoom image is obtained by placing an enlarged image obtained by electronically processing the optical image captured in the first position on a peripheral area of the optical image captured in the second position.

21. A portable equipment with camera comprising:
a camera recited in claim 1; and
a display device for displaying images obtained by the camera.

22. A portable equipment with camera comprising:
a camera recited in claim 9; and
a display device for displaying images obtained by the camera.

23. A portable equipment with camera comprising:
a camera recited in claim 13; and
a display device for displaying images obtained by the camera.

* * * * *